US012738408B2

(12) United States Patent
Chen et al.

(10) Patent No.: US 12,738,408 B2
(45) Date of Patent: Sep. 15, 2026

(54) TRANSFORMER

(71) Applicant: Lite-On Technology Corporation, Taipei (TW)

(72) Inventors: Chen Chen, Taipei (TW); Kai-De Chen, Taipei (TW); De Jia Lu, Taipei (TW); Yong-Long Syu, Taipei (TW); Chao Lin Chung, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 974 days.

(21) Appl. No.: 17/987,871

(22) Filed: Nov. 16, 2022

(65) Prior Publication Data

US 2023/0230748 A1 Jul. 20, 2023

(30) Foreign Application Priority Data

Jan. 14, 2022 (CN) ......................... 202210041543.2

(51) Int. Cl.

*H01F 27/26* (2006.01)
*H01F 27/28* (2006.01)
*H01F 27/30* (2006.01)

(52) U.S. Cl.

CPC ....... *H01F 27/266* (2013.01); *H01F 27/2847* (2013.01); *H01F 27/306* (2013.01)

(58) Field of Classification Search

CPC .. H01F 27/266; H01F 27/2847; H01F 27/306; H01F 27/263; H01F 27/2804; H01F 27/2823; H01F 27/324; H01F 3/14; H01F 27/34

USPC ......................... 336/182, 55–60, 65, 221, 83

See application file for complete search history.

(56) References Cited

U.S. PATENT DOCUMENTS

| | | | | |
|---|---|---|---|---|
| 4,345,229 | A * | 8/1982 | Alley | H01F 38/10 336/212 |
| 6,449,178 | B1 * | 9/2002 | Sakai | H01F 29/14 363/131 |
| 2008/0224809 | A1 * | 9/2008 | Zhang | H01F 3/12 336/170 |
| 2009/0295524 | A1 * | 12/2009 | Silva | H01F 27/346 336/212 |
| 2015/0302968 | A1 * | 10/2015 | Lin | H01F 27/24 336/83 |
| 2019/0311846 | A1 * | 10/2019 | Ren | H01F 27/306 |
| 2020/0027651 | A1 * | 1/2020 | Chen | H01F 27/24 |

(Continued)

FOREIGN PATENT DOCUMENTS

| | | |
|---|---|---|
| CN | 202650809 | 1/2013 |
| TW | I493579 | 7/2015 |

OTHER PUBLICATIONS

"Office Action of China Counterpart Application", issued on May 12, 2026, p. 1-p. 6.

*Primary Examiner* — Shawki S Ismail
*Assistant Examiner* — Kazi S Hossain
(74) *Attorney, Agent, or Firm* — JCIPRNET

(57) ABSTRACT

A transformer includes iron cores and a winding structure. The iron cores are stacked on each other at intervals, and iron core gaps are formed between the iron cores, wherein relative positions between the iron core gaps are fixed. The winding structure is disposed around the iron cores and includes a plurality of coils. A position of at least one of the iron core gaps corresponds to a position of at least one of coils.

10 Claims, 7 Drawing Sheets

(56) References Cited

U.S. PATENT DOCUMENTS

| | | | |
|---|---|---|---|
| 2020/0126746 | A1 | 4/2020 | Zhang et al. |
| 2020/0287467 | A1 * | 9/2020 | Sigamani ................ H01F 30/10 |

* cited by examiner

TRANSFORMER

CROSS-REFERENCE TO RELATED APPLICATION

This application claims the priority benefit of China application serial no. 202210041543.2, filed on Jan. 14, 2022. The entirety of the above-mentioned patent application is hereby incorporated by reference herein and made a part of this specification.

BACKGROUND OF THE INVENTION

Field of the Invention

The invention relates to a transformer, and in particular to a transformer having good performance.

Description of Related Art

As the application of transformers becomes more and more diverse, how to improve the efficiency of transformers and reduce losses is the object of research in the art.

SUMMARY OF THE INVENTION

The invention provides a transformer having good performance.

A transformer of the invention includes a plurality of iron cores and a winding structure. The iron cores are stacked on each other at intervals, and a plurality of iron core gaps are formed between the iron cores, wherein relative positions between the iron core gaps are fixed. The winding structure is disposed around the iron cores and includes a plurality of coils, a position of at least one of the iron core gaps corresponds to a position of at least one of the coils.

In an embodiment of the invention, the winding structure also includes a plurality of copper sheets or a plurality of circuit boards, the copper sheets or the circuit boards are disposed alternately with the coils, and a position of the at least one of the iron core gaps is staggered from positions of the copper sheets or the circuit boards.

In an embodiment of the invention, the coils are high-voltage side winding groups, and the copper sheets or the circuit boards are low-voltage side winding groups.

In an embodiment of the invention, a number of the iron core gaps is less than or equal to a number of the coils.

In an embodiment of the invention, the transformer further includes a winding frame, wherein the winding frame includes an annular sidewall and a plurality of spacers disposed in parallel in the annular sidewall, the spacers divide a space in the annular sidewall into a plurality of first shelves, and at least several of the iron cores are inserted into the first shelves.

In an embodiment of the invention, the winding frame further includes a plurality of second shelves, the first shelves and the second shelves are alternately stacked, the iron core gaps are formed at least in the second shelves, and a height of the first shelf is greater than a height of the second shelf.

In an embodiment of the invention, the winding frame further includes a third shelf, a height of the third shelf is greater than a height of the first shelf, and the height of the third shelf is greater than twice a height of the iron core.

In an embodiment of the invention, two of the iron cores are disposed on the third shelf, and a movable spacer is disposed between the two iron cores in the third shelf.

In an embodiment of the invention, the winding frame includes a plurality of positioning portions extended from an inner surface of the annular sidewall and located in the first shelves, and the positioning portions are abutted against the iron cores.

In an embodiment of the invention, the winding frame includes a first portion and a second portion which are separable, the first portion includes a portion of the annular sidewall and a portion of each of the spacers, and the second portion includes another portion of the annular sidewall and another portion of each of the spacers.

In an embodiment of the invention, at least several of the iron core gaps have a same height.

Based on the above, the iron cores of the transformer of the invention are stacked on each other at intervals, a plurality of iron core gaps are formed between the iron cores, and the relative positions between the iron core gaps are fixed. The winding structure is disposed around the iron cores and includes a plurality of coils, and a position of at least one of the iron core gaps corresponds to a position of at least one of the coils. In the transformer of the invention, the iron core gaps between the iron cores may effectively reduce losses caused by fringing flux effects. The relative positions between the iron core gaps are fixed to effectively reduce error between the actual iron core gaps of the transformer and the theoretical iron core gaps. In addition, according to actual measurement, the position of the iron core gap correspond to the coil to effectively reduce copper loss and improve performance.

DESCRIPTION OF THE EMBODIMENTS

Figure 1:
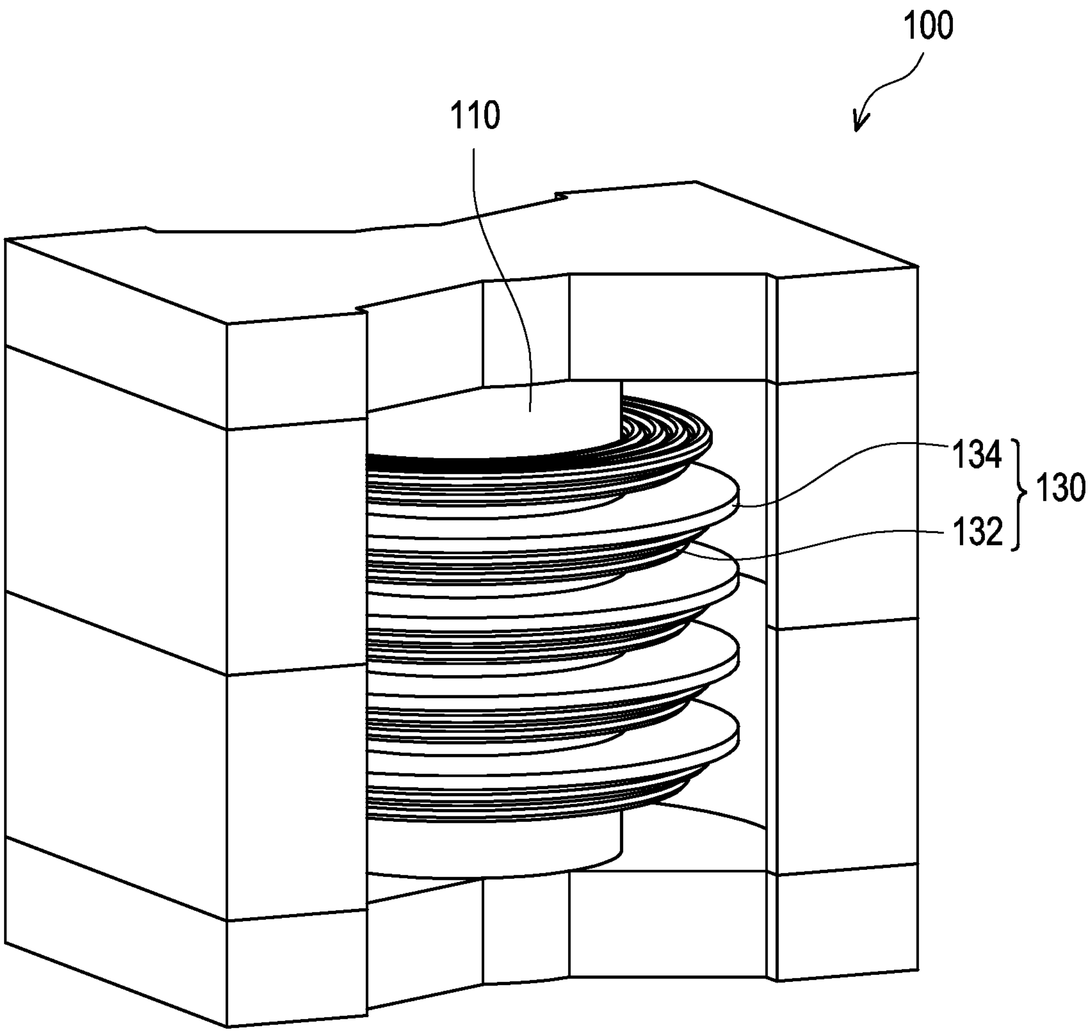
FIG. 1 is a three-dimensional schematic view of a transformer according to an embodiment of the invention.

FIG. 1 is a three-dimensional schematic view of a transformer according to an embodiment of the invention. Referring to FIG. 1, in the present embodiment, a transformer 100 may be applied to, for example, an off-board charger (not shown) of an electric vehicle, but the application of the transformer 100 is not limited thereto.

Figure 2A:
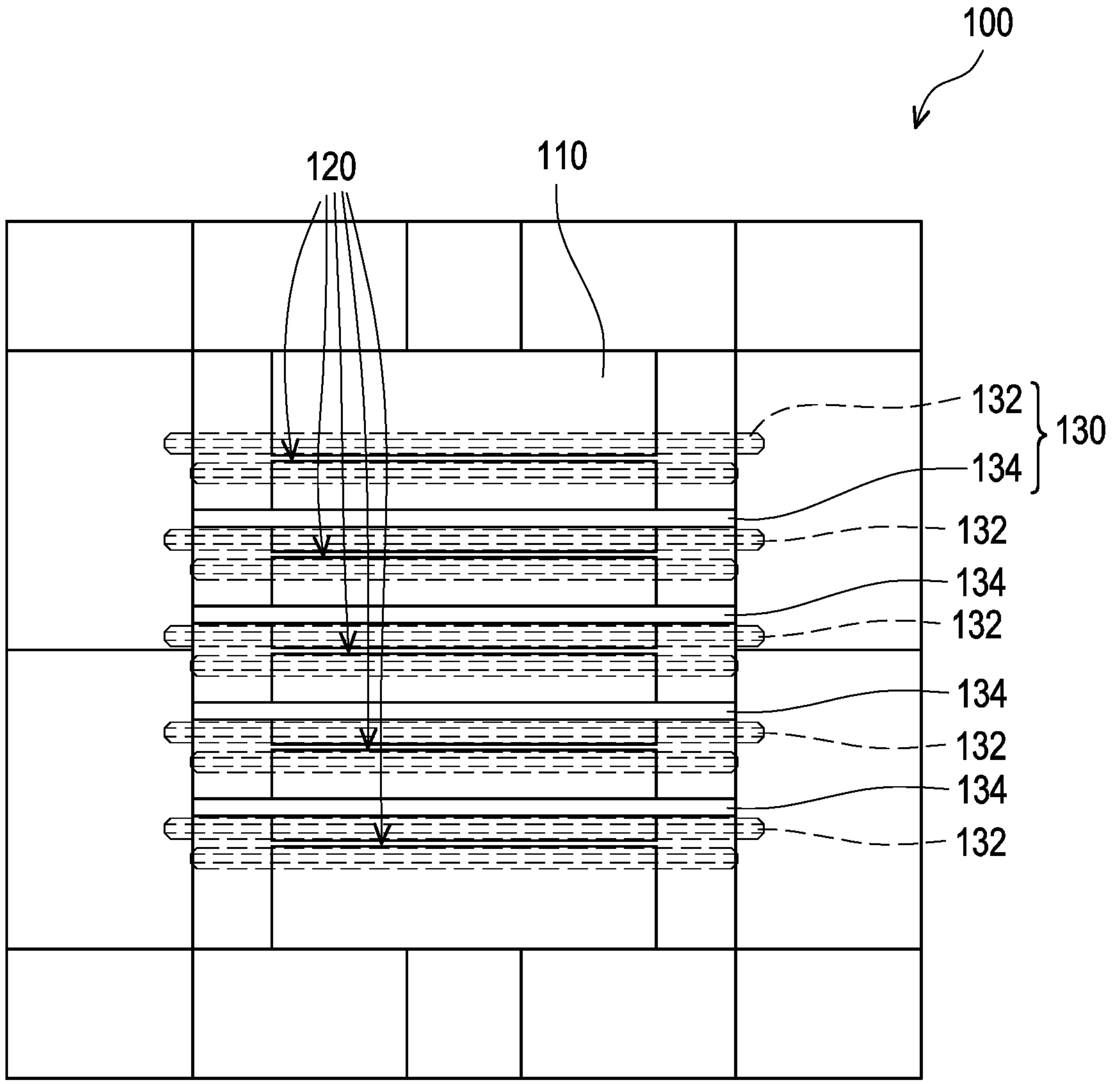
FIG. 2A is a see-through schematic front view of the coils of the transformer of FIG. 1.
Figure 2B:
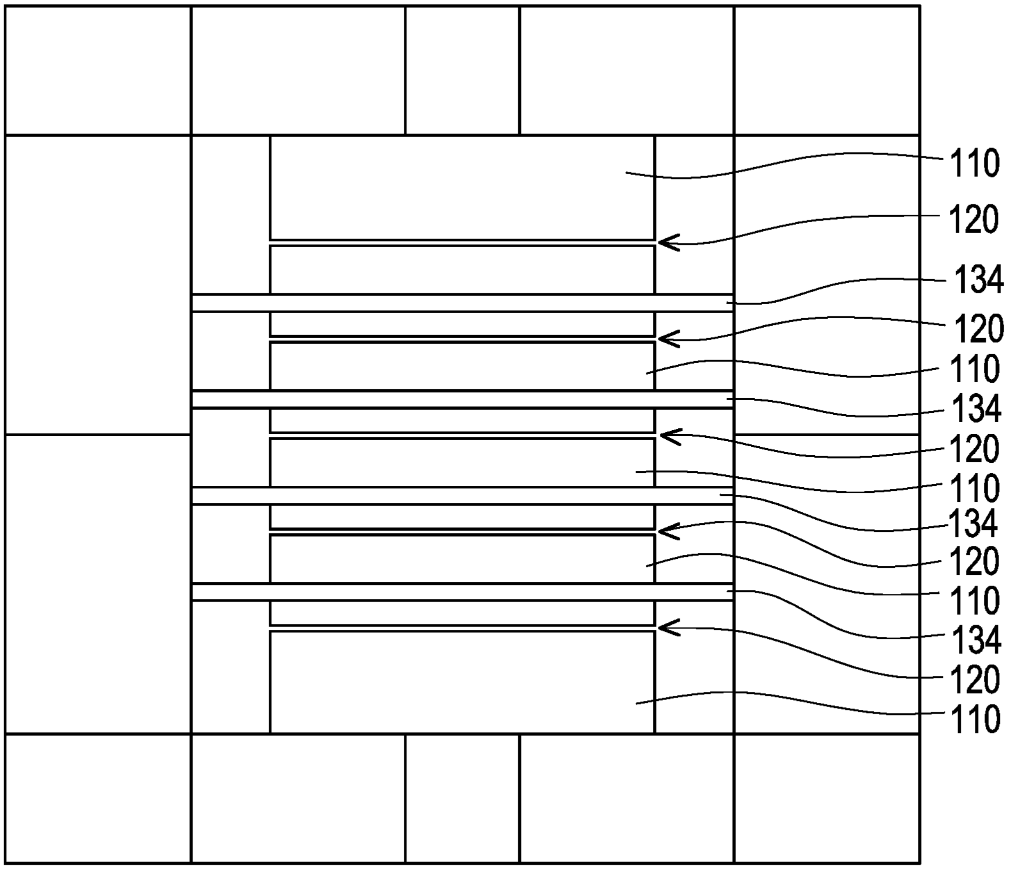
FIG. 2B is a schematic front view of the hidden coils of the transformer of FIG. 1.

FIG. 2A is a see-through schematic front view of the coils of the transformer of FIG. 1. FIG. 2B is a schematic front view of the hidden coils of the transformer of FIG. 1. Referring to FIG. 1 to FIG. 2B, in the present embodiment, the transformer 100 includes a plurality of iron cores 110 and a winding structure 130. As shown in FIG. 2B, the iron cores 110 are stacked on each other at intervals, and a plurality of iron core gaps 120 are formed between the iron cores 110.

The iron core gaps 120 between the iron cores 110 may effectively reduce losses caused by fringing flux effects.

In addition, as shown in FIG. 1, the winding structure 130 is disposed at the periphery of the iron cores 110 and includes a plurality of coils 132 and a plurality of copper sheets 134. The copper sheets 134 are alternately arranged with the coils 132. The coils 132 are, for example, high-voltage side winding groups, and the copper sheets 134 are, for example, low-voltage side winding groups.

It is worth mentioning that, as shown in FIG. 2B, the number of the iron core gaps 120 is less than or equal to the number of the coils 132. In the present embodiment, the number of the iron cores 110 is six, and the number of the iron core gaps 120 is five. As shown in FIG. 1, the number of layers of the coils 132 is five, and the number of layers of the copper sheets 134 is four. In the present embodiment, the number of the iron core gaps 120 is equal to the number of the coils 132. Of course, in other embodiments, the number of the iron core gaps 120 may also be less than the number of the coils 132, which is not limited by the drawings.

Moreover, it may be known from FIG. 2A and FIG. 2B that the position of at least one of the iron core gaps 120 corresponds to the position of at least one of the coils 132, and the position of the at least one iron core gap 120 is staggered from the positions of the copper sheets 134. In the present embodiment, the positions of the iron core gaps 120 correspond to the positions of at least several of the coils 132, and the positions of the iron core gaps 120 are staggered from the positions of the copper sheets 134. That is, the positions of the iron core gaps 120 correspond to at least a portion of the high-voltage side winding groups, and are staggered from at least one of the low-voltage side winding groups.

Specifically, in the present embodiment, the positions of the five iron core gaps 120 correspond to the five layers of coils 132, and are staggered from the four layers of copper sheets 134. In other words, the positions of the iron core gaps 120 correspond to the positions of all the coils 132. That is, the coils 132 surround the periphery of the iron core gaps 120 in a one-to-one manner.

Figure 3A:
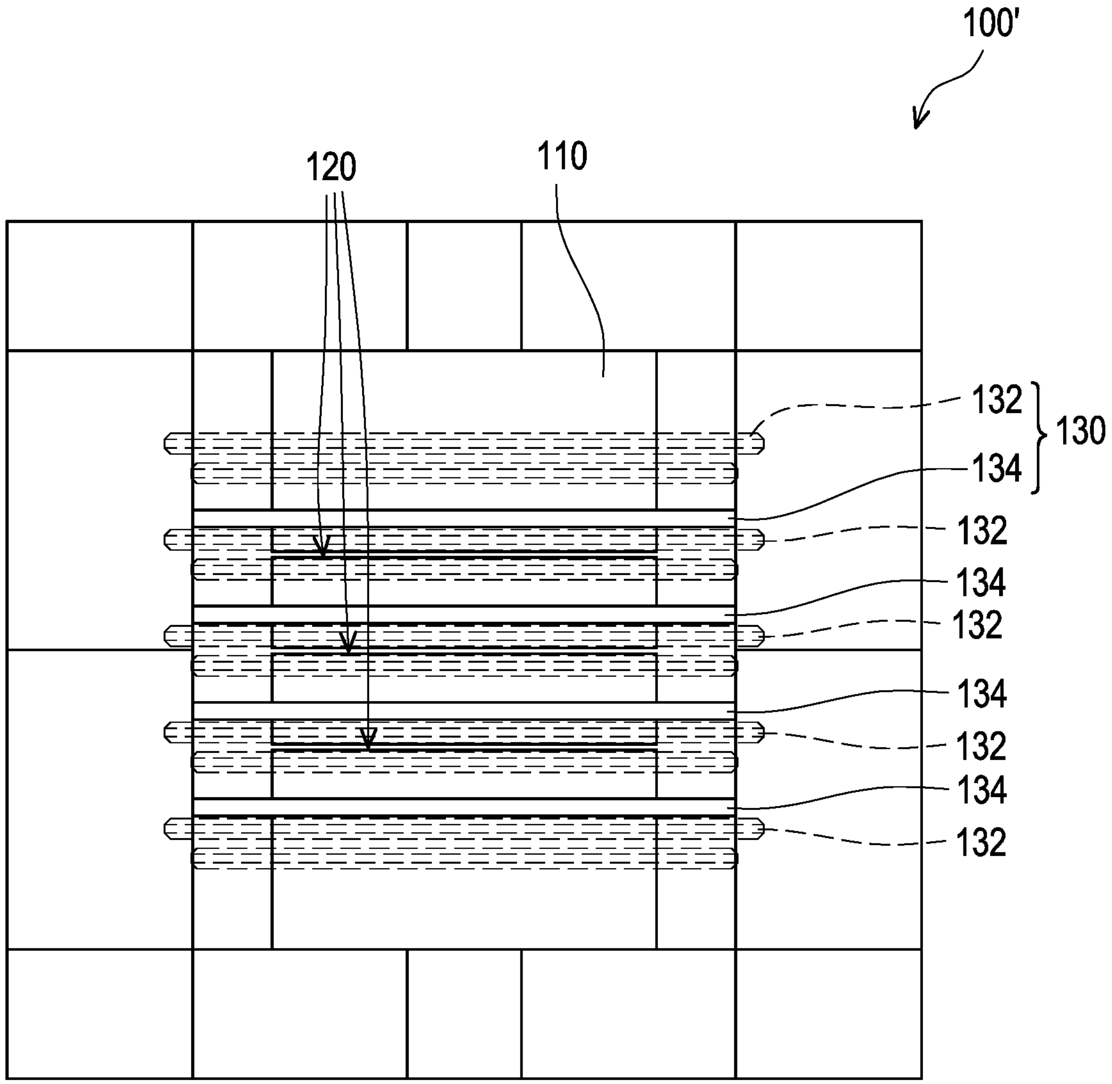
FIG. 3A is a see-through schematic front view of the coils of the transformer according to an embodiment of the invention.
Figure 3B:
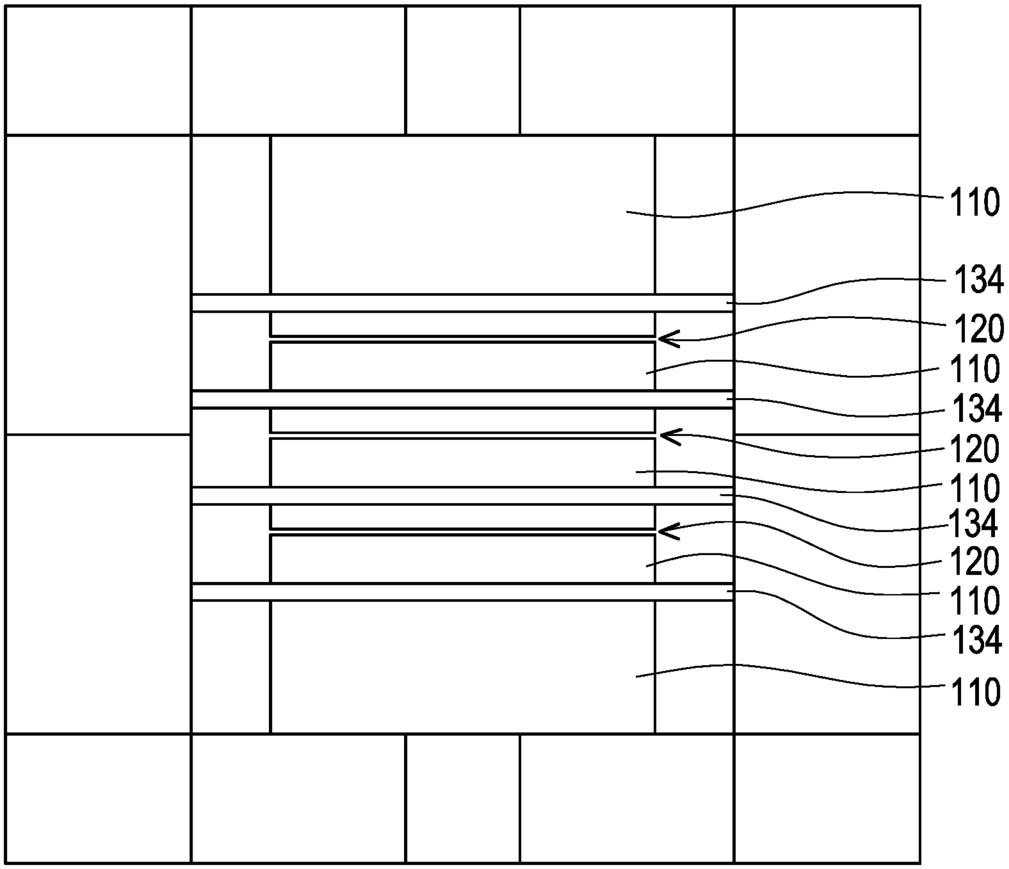
FIG. 3B is a schematic front view of the hidden coils of the transformer of FIG. 3A.

FIG. 3A is a see-through schematic front view of the coils of the transformer according to an embodiment of the invention. FIG. 3B is a schematic front view of the hidden coils of the transformer of FIG. 3A. Referring to FIG. 3A and FUG. 3B, a main difference between FIG. 3A and FIG. 2A is that, in the transformer 100' of FIG. 3A, the number of the iron core gaps 120 is less than the number of the coils 132. Specifically, the number of the iron core gaps 120 is three, and the number of the coils 132 is five. The positions of the iron core gaps 120 may also only correspond to the positions of a portion of the coils 132. For example, the three of the coils 132 surround the periphery of the three iron core gaps 120, and the remaining two coils 132 surrounds the periphery of two of the iron cores 110.

It should be mentioned that, in other embodiments, the copper sheets 134 may also be replaced by a plurality of circuit boards. That is, the low-voltage side winding groups are formed by a plurality of circuit boards, and the low-voltage side winding groups are not limited to the copper sheets 134.

It is worth mentioning that, in the present embodiment, the positions of the iron cores 110 are fixed, so that the relative positions between the iron core gaps 120 may be fixed. Such a design may effectively reduce the error between the actual iron core gaps 120 of the transformer 100 and the theoretical iron core gaps.

The following will further describe how the transformer 100 uses a winding frame 140 (FIG. 4) to fix the relative positions between the iron core gaps 120. It should be mentioned that in the following embodiments, in order to clearly illustrate the relationship between the winding frame 140 and the iron cores 110, the winding structure 130 is hidden. In the following embodiments, please refer to FIG. 1 to FIG. 2B for the relative positions between the winding structure 130, the iron cores 110, and the iron core gaps 120.

Figure 4:
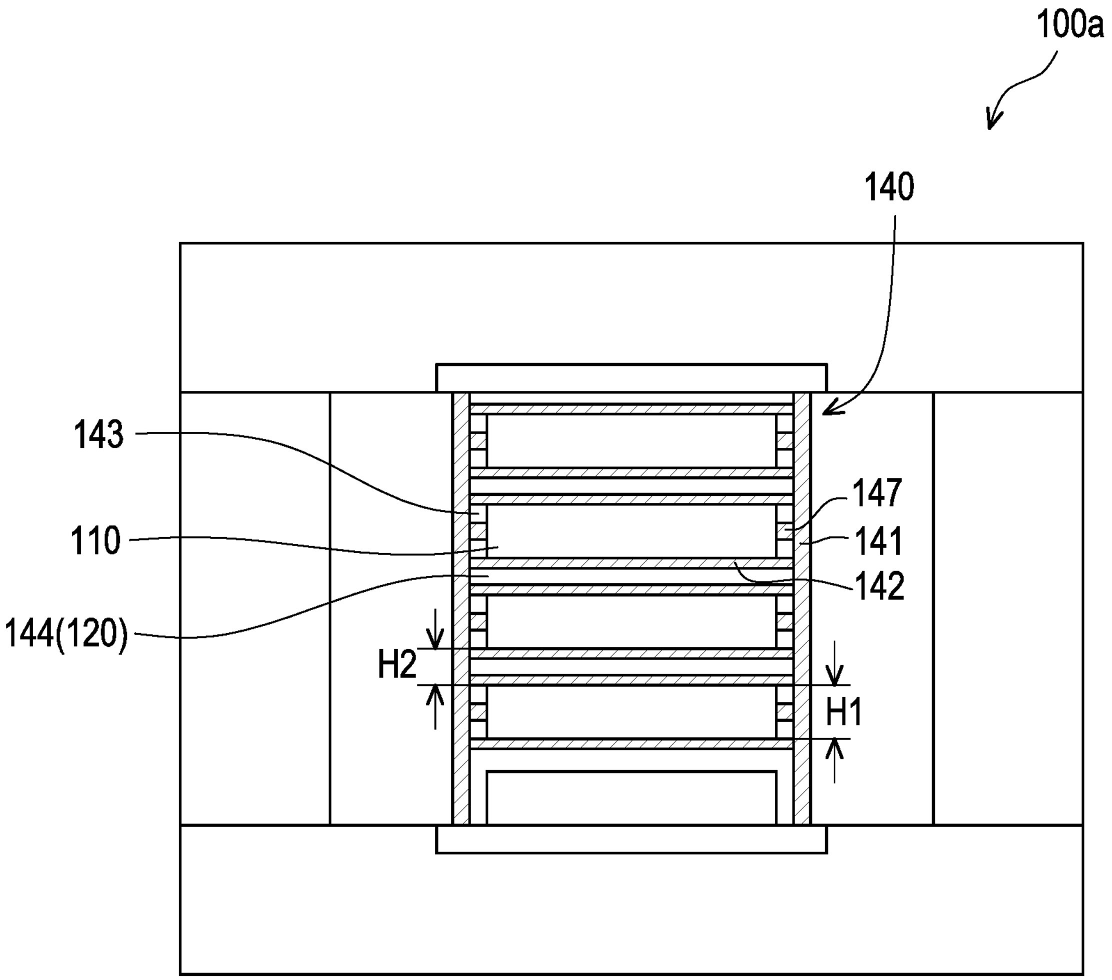
FIG. 4 is a schematic diagram of a transformer according to another embodiment of the invention.

FIG. 4 is a schematic diagram of a transformer according to another embodiment of the invention. Referring to FIG. 4, a transformer **100*a* includes the winding frame 140. In the present embodiment, the winding frame 140 includes an annular sidewall 141 (vertical wall) and a plurality of spacers 142 (horizontal plates) disposed in parallel in the annular sidewall 141. The spacers 142 separate the space in the annular sidewall 141 into a plurality of first shelves 143 and a plurality of second shelves 144**.

In the present embodiment, the first shelves 143 and the second shelves 144 are stacked alternately. A height H1 of the first shelf 143 is greater than a height H2 of the second shelf 144. The height H1 of the first shelf 143 is greater than or equal to the height of the iron core 110. Therefore, the iron cores 110 may be inserted into the first shelves 143, and the iron core gaps 120 are formed at least in the second shelves 144.

In other words, in the present embodiment, the first shelves 143 form a structure similar to a drawer frame or a rack, and the iron cores 110 may be inserted into the first shelves 143, which is convenient for mounting. Since the iron cores 110 are inserted into the shelves, they are placed on the corresponding spacers 142.

Therefore, the positions of the iron cores 110 in the vertical direction are fixed. Correspondingly, the distances between the iron cores 110 are also fixed, so that the positions of the iron core gaps 120 between the iron cores 110 are also fixed.

Specifically, the height H2 of the iron core gaps 120 is attributed to the height of the second shelf 144 and the thickness of two spacers 142. In the present embodiment, the heights H2 of the iron core gaps 120 are the same, but not limited thereto.

In the transformer **100*a* of the present embodiment, the heights H2 of the iron core gaps 120 may be fixed via the above design. Therefore, the error between the actual iron core gaps 120 of the transformer 100*a* and the theoretical iron core gaps may be effectively reduced, and the transformer 100*a*** may be manufactured in a low-cost manner.

Moreover, in the present embodiment, the winding frame 140 includes a plurality of positioning portions 147 extended from an inner surface of the annular sidewall 141 and located in the first shelves 143, and the positioning portions 147 are abutted against the iron cores 110. Therefore, the iron cores 110 may be abutted by the surrounding positioning portions 147 in the first shelves 143, and the positions of the iron cores 110 in the horizontal direction may be maintained. That is, the iron cores 110 may be firmly fixed in the first shelves 143. The material of the winding frame 140 is, for example, plastic, and the entirety of the winding frame 140 or the positioning portions 147 may be manufactured by 3D printing, but not limited thereto.

Figure 5:
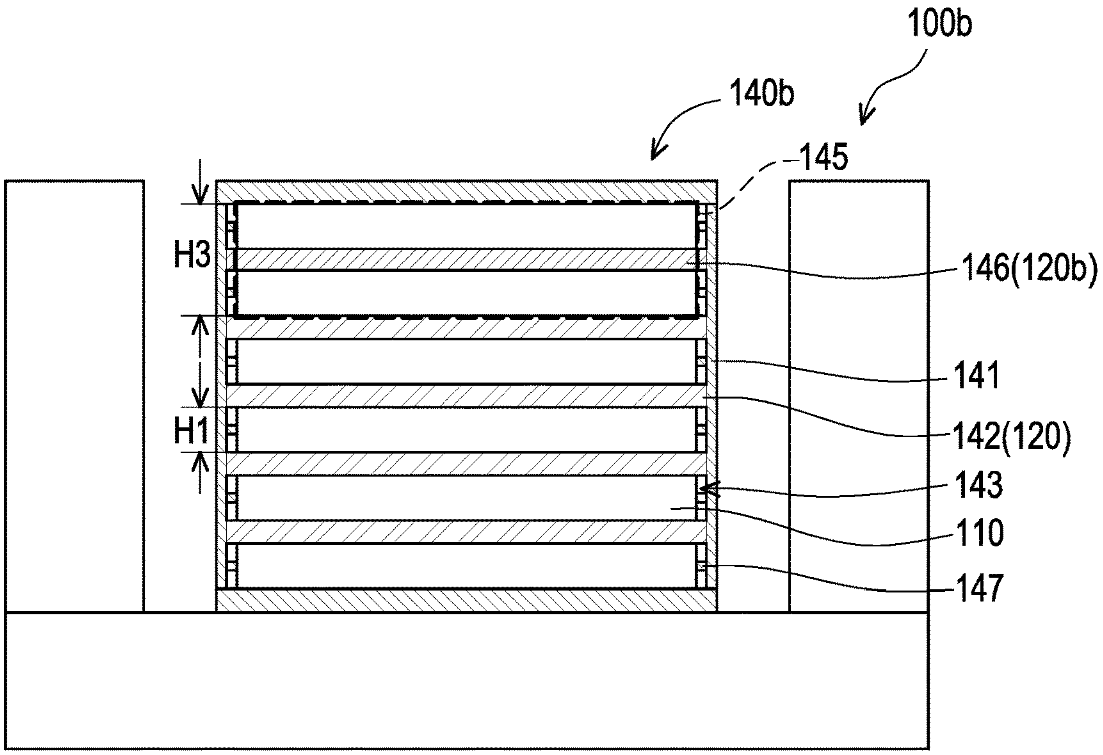
FIG. 5 is a schematic diagram of a transformer according to another embodiment of the invention.

FIG. 5 is a schematic diagram of a transformer according to another embodiment of the invention. Referring to FIG. 5, the main difference between a transformer **100*b* of the present embodiment and the transformer 100*a* of FIG. 4 is that, in the present embodiment, the iron core gaps 120 are attributed to the thickness of the spacers 142. Moreover, in addition to the first shelves 143, a winding frame 140***b* further includes a third shelf 145 in order to provide iron core gaps 120*b* of other sizes to adjust inductance.

The third shelf 145 is located above the first shelves 143, a height H3 of the third shelf 145 is greater than the height H1 of the first shelf 143, and the height H3 of the third shelf 145 is greater than twice the height of the iron core 110, so that the iron core gaps 120*b* with the same or different heights may be formed at the third shelf 145.

Specifically, in the present embodiment, the number of the iron cores 110 is six, and the number of the first shelves 143 is four. A portion (four) of the iron cores 110 are inserted into the first shelves 143, and two of the iron cores 110 are disposed on the third shelf 145. In addition, a movable spacer 146 is disposed between the two iron cores 110 in the third shelf 145.

During assembly, one of the iron cores 110 may be placed in the third shelf 145 first, then the movable spacer 146 of a desired thickness may be placed on this iron core 110, and then the uppermost iron core 110 is placed on the movable spacer 146. The uppermost iron core gap 120*b* is attributed to the height (thickness) of the movable spacer 146, and the height of the uppermost iron core gap 120*b* may be different from the height of the other iron core gap 120.

Figure 6:
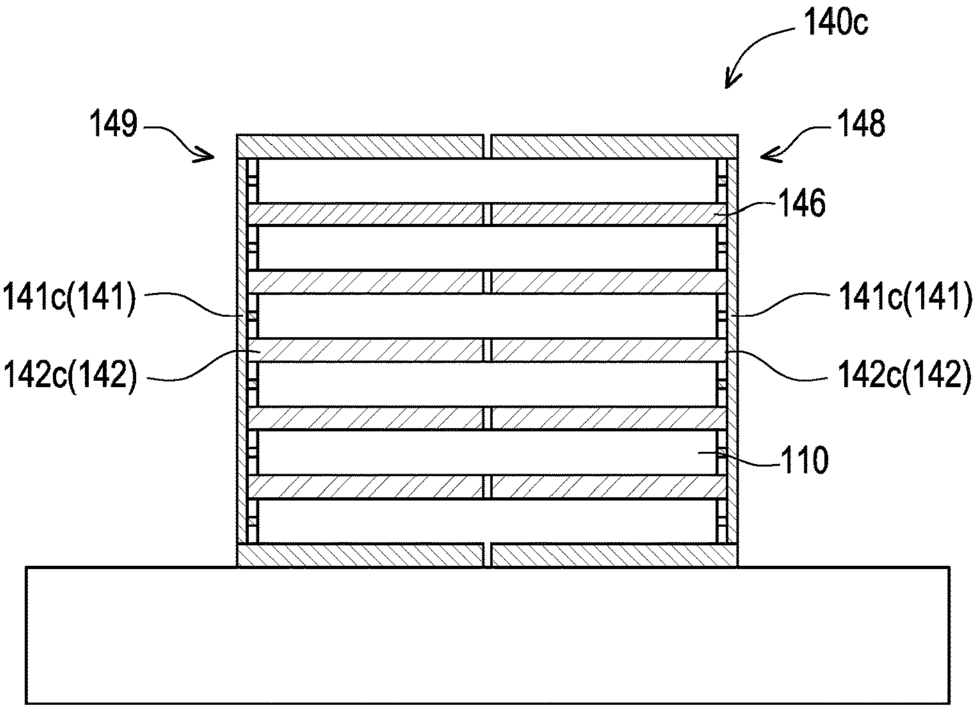
FIG. 6 is a schematic diagram of a winding frame according to another embodiment of the invention.

FIG. 6 is a schematic diagram of a winding frame according to another embodiment of the invention. Referring to FIG. 6, the main difference between a winding frame 140*c* of the present embodiment and the winding frame 140*b* of FIG. 5 is that in the present embodiment, the winding frame 140*c* includes a first portion 148 (e.g., a right half) and a second portion 149 (e.g., a left half) that may be separated from left to right. The first portion 148 includes a semi-annular sidewall 141*c* and semi-spacers 142*c*. The second portion 149 includes the semi-annular sidewall 141*c* and the semi-spacers 142*c*.

In the present embodiment, the semi-annular sidewall 141*c* of the first portion 148 and the semi-annular sidewall 141*c* of the second portion 149 may be assembled to form the annular sidewall 141. The semi-spacers 142*c* of the first portion 148 and the semi-spacers 142*c* of the second portion 149 may be assembled to form the spacers 142.

In other words, the first portion 148 includes a portion of the annular sidewall 141 and a portion of each of the spacers 142, and the second portion 149 includes another portion of the annular sidewall 141 and another portion of each of the spacers 142.

In the present embodiment, the first portion 148 and the second portion 149 are, for example, two equal right and left halves. In other embodiments, the first portion 148 and the second portion 149 may also be two halves that are not equally divided. For example, the first portion 148 may be greater than the second portion 149.

The first portion 148 may be, for example, a fixed structure, and the second portion 149 may be, for example, a movable structure. During assembly, after the iron cores 110 are placed on the semi-spacers 142*c* of the first portion 148, the semi-spacers 142*c* of the second portion 149 may be inserted between the iron cores 110 horizontally.

Similarly, the winding frame 140*c* of the present embodiment serves as the iron core gaps 120 between two adjacent iron cores 110 via the height of the spacer 142. Therefore, the relative positions between the iron core gaps 120 may be accurately positioned to effectively reduce error between the actual iron core gaps of the transformer and the theoretical iron core gaps.

Based on the above, the iron cores of the transformer of the invention are stacked on each other at intervals, a plurality of iron core gaps are formed between the iron cores, and the relative positions between the iron core gaps are fixed. The winding structure is disposed around the iron cores and includes a plurality of coils, and a position of at least one of the iron core gaps corresponds to a position of at least one of the coils. In the transformer of the invention, the iron core gaps between the iron cores may effectively reduce losses caused by fringing flux effects. The relative positions between the iron core gaps are fixed to effectively reduce error between the actual iron core gaps of the transformer and the theoretical iron core gaps. In addition, according to actual measurement, the positions of the iron core gaps correspond to the coils to effectively reduce copper loss and improve performance.

What is claimed is:

1. A transformer, comprising:

a plurality of iron cores stacked, on each other at intervals, and a plurality of iron core gaps are formed between the plurality of iron cores, wherein relative positions between the plurality of iron core gaps are fixed; and a winding structure disposed around the plurality of iron cores and comprising a plurality of coils, wherein a position of at least one of the plurality of iron core gaps corresponds to a position of at least one of the plurality of coils, wherein the winding structure further comprises a plurality of copper sheets or a plurality of circuit boards, the plurality of copper sheets or the plurality of circuit boards are disposed alternately with the plurality of coils, and a position of the at least one of the plurality of iron core gaps is staggered from positions of the plurality of copper sheets or the plurality of circuit boards.

2. The transformer of claim 1, wherein the plurality of coils are high-voltage side winding groups, and the plurality of copper sheets or the plurality of circuit boards are low-voltage side winding groups.

3. The transformer of claim 1, wherein a number of the plurality of iron core gaps is less than or equal to a number of the plurality of coils.

4. The transformer of claim 1, further comprising a winding frame, wherein the winding frame comprises an annular sidewall and a plurality of spacers disposed in parallel in the annular sidewall, the plurality of spacers divide a space in the annular sidewall into a plurality of first shelves, and at least several of the plurality of iron cores are inserted into the plurality of first shelves.

5. The transformer of claim 4, wherein the winding frame further comprises a plurality of second shelves, the plurality of first shelves and the plurality of second layer frames are alternately stacked, the plurality of iron core gaps are formed at least in the plurality of second shelves, and a height of the first shelf is greater than a height of the second shelf.

6. The transformer of claim 4, wherein the winding frame further comprises a third shelf, a height of the third shelf is greater than a height of the first shelf, and the height of the third shelf is greater than twice a height of the iron core.

7. The transformer of claim 6, wherein two of the plurality of iron cores are disposed on the third shelf, and a movable spacer is disposed between the two iron cores in the third shelf.

8. The transformer of claim 4, wherein the winding frame comprises a plurality of positioning portions extended from an inner surface of the annular sidewall and located in the plurality of first shelves, and the plurality of positioning portions are abutted against the plurality of iron cores.

9. The transformer of claim 4, wherein the winding frame comprises a first portion and a second portion which are separable, the first portion comprises a portion of the annular sidewall and a portion of each of the plurality of spacers, and the second portion comprises another portion of the annular sidewall and another portion of each of the plurality of spacers.

10. The transformer of claim 1, wherein at least several of the plurality of iron core gaps have a same height.

* * * * *